(12) United States Patent
Ekladyous et al.

(10) Patent No.: US 10,549,679 B1
(45) Date of Patent: Feb. 4, 2020

(54) LAMP SELECTIVELY CONNECTABLE TO MOVEABLE OR FIXED VEHICLE PANEL AND LAMP PLACEMENT METHOD

(71) Applicant: Ford Global Technologies, LLC, Dearborn, MI (US)

(72) Inventors: Albert Ekladyous, Shelby Township, MI (US); Lisa Hohmann, Clinton Township, MI (US); Hardyal Singh, Canton, MI (US); Masoud Hashemi, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/104,476

(22) Filed: Aug. 17, 2018

(51) Int. Cl.
*B60Q 1/30* (2006.01)
*B60Q 1/44* (2006.01)
*B60Q 1/26* (2006.01)
*B60Q 9/00* (2006.01)

(52) U.S. Cl.
CPC ............ *B60Q 1/30* (2013.01); *B60Q 1/2619* (2013.01); *B60Q 1/44* (2013.01); *B60Q 9/00* (2013.01)

(58) Field of Classification Search
CPC .. B60Q 1/2661; B60Q 1/2615; B60Q 1/2669; B60Q 1/30; B60Q 1/0483; B60Q 3/35; B60Q 3/88
USPC .................................................. 362/459–549
See application file for complete search history.

(56) References Cited

U.S. PATENT DOCUMENTS

| | | | | |
|---|---|---|---|---|
| 4,831,503 A * | 5/1989 | DeSantis | ............. | B60Q 1/2607 362/497 |
| 5,394,311 A | 2/1995 | Asano | | |
| 7,199,705 B1 | 4/2007 | Mixon | | |
| 7,834,750 B1 * | 11/2010 | Hertz | .................. | B60Q 1/2692 362/485 |
| 2013/0141926 A1 * | 6/2013 | McDermott | ........ | B60Q 1/2615 362/485 |
| 2014/0333428 A1 | 11/2014 | Markell | | |
| 2015/0043231 A1 * | 2/2015 | Clark | ................... | G09F 21/048 362/485 |
| 2017/0290122 A1 | 10/2017 | Gaborieau | | |

FOREIGN PATENT DOCUMENTS

| | | |
|---|---|---|
| CN | 101858494 | 10/2010 |
| CN | 107187381 | 9/2017 |

OTHER PUBLICATIONS

2017 Lincoln MKC Review, Specs, Price, MSRP, Performance, retrieved on Jun. 28, 2018 from https://www.fordcarsinfo.com/lincoln/2017lincolnmkc/.

* cited by examiner

*Primary Examiner* — William J Carter
(74) *Attorney, Agent, or Firm* — Vichit Chea; Carlson, Gaskey & Olds, P.C.

(57) ABSTRACT

An example vehicle assembly includes, among other things, a lamp, a moveable panel, and a fixed panel. The moveable panel is configured such that the lamp is operably mountable to the moveable panel under a first operating condition. The fixed panel configured such that the lamp is operably mountable to the fixed panel under a different, second operating condition. An example lamp placement method includes, among other things, under a first operating condition, operably mounting a lamp to a moveable panel of a vehicle. Under a different, second operating condition, the method (Continued)

includes operably mounting the lamp to a fixed panel of the vehicle.

7 Claims, 5 Drawing Sheets

LAMP SELECTIVELY CONNECTABLE TO MOVEABLE OR FIXED VEHICLE PANEL AND LAMP PLACEMENT METHOD

TECHNICAL FIELD

This disclosure relates generally to a lamp for a vehicle and, more particularly, to a lamp operably mountable to a moveable panel under some opening conditions and to a fixed panel under other operating conditions.

BACKGROUND

Motor vehicles are known to include lighting systems that include lamps. The lamps can illuminate to increase the visibility of the vehicle, allowing other drivers and pedestrians to see the vehicle and the driver's intentions regarding direction of travel. Lamps can include passenger and driver side rear lamps that selectively illuminate to indicate that the vehicle is turning, braking, or both. Regulations can require that such lamps be visible. If the lamps are mounted to a moveable panel of the vehicle, such as a liftgate, the vehicle may include redundant lamps within a fixed panel. The redundant lamps in the fixed panel can illuminate when the liftgate is open and the lamps within the liftgate are obstructed from view.

SUMMARY

A vehicle assembly according to an exemplary aspect of the present disclosure includes, among other things, a lamp, a moveable panel, and a fixed panel. The moveable panel is configured such that the lamp is operably mountable to the moveable panel under a first operating condition. The fixed panel configured such that the lamp is operably mountable to the fixed panel under a different, second operating condition.

In another example of the foregoing assembly, the first operating condition corresponds to the moveable panel being in a closed position, and the second operating condition corresponds to the moveable panel being in an open position.

In another example of any of the foregoing assemblies, the lamp is powered through the moveable panel when operably mounted to the moveable panel, and powered through the fixed panel when operably mounted to the fixed panel.

Another example of any of the foregoing assemblies includes a rub strip and a pocket in the fixed panel. The lamp is received within the pocket when the lamp is operably mounted to the fixed panel. The rub strip is configured to attach to the fixed panel to cover at least a portion of the pocket when the lamp is operably mounted to the moveable panel.

Another example of any of the foregoing assemblies includes a reflector disposed adjacent to the pocket.

In another example of the foregoing assembly, the moveable panel is a liftgate at a rear of a vehicle.

In another example of the foregoing assembly, the fixed panel is a rear fascia.

In another example of the foregoing assembly, the lamp is a rear lamp of a vehicle.

In another example of the foregoing assembly, the lamp is a combination lamp.

In another example of the foregoing assembly, the lamp is operably mountable to the moveable panel or the fixed panel when the lamp is in a first orientation, and the lamp is operably mountable to the moveable panel or the fixed panel when the lamp is in a second orientation that is 180 degrees offset from the first orientation.

In another example of the foregoing assembly, the lamp is a driver side brake lamp, and the assembly further includes a passenger side brake lamp. The moveable panel is configured such that the passenger side brake lamp is operably mountable to the moveable panel under the first operating condition. The fixed panel is configured such that the passenger side brake lamp is operably mountable to the fixed panel under the second operating condition.

A lamp placement method according to another exemplary aspect of the present disclosure includes, among other things, under a first operating condition, operably mounting a lamp to a moveable panel of a vehicle. Under a different, second operating condition, the method includes operably mounting the lamp to a fixed panel of the vehicle.

In another non-limiting example of the foregoing method, the first operating condition corresponds to the moveable panel being in a closed position, and the second operating condition corresponds to the moveable panel being in an open position.

Another non-limiting example of any of the foregoing methods includes transitioning an indicator if the moveable panel is in the open position and the lamp is not operably mounted to the fixed panel.

In another non-limiting example of any of the foregoing methods, the transitioning of the indicator comprises illuminating an indicator within a display.

Another non-limiting example of the foregoing method includes blocking a shifting of the vehicle to a gear if the moveable panel is in the open position and the lamp is not operably mounted to the fixed panel.

In another non-limiting example of the foregoing method, the moveable panel is in the closed position when latched, and the moveable panel is in the open position when unlatched.

Another non-limiting example of any of the foregoing methods includes powering the lamp through the moveable panel when the lamp is operably mounted to the moveable panel, and powering the lamp through the fixed panel when the lamp is operably mounted to the fixed panel.

Another non-limiting example of any of the foregoing methods includes at least partially receiving the lamp within a pocket of the fixed panel when the lamp is operably mounted to the fixed panel, and covering at least a portion of the pocket with a rub strip when the lamp is operably mounted to the moveable panel.

In another non-limiting example of any of the foregoing methods, the lamp is a brake lamp, and the moveable panel is a liftgate

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates generally to a lamp for a vehicle. The lamp can be positioned within a moveable panel during typical operation. Placing the lamp in the moveable panel can, in some examples, provide improved access to cargo areas of the vehicle and can position cut lines between the moveable panel and other panels of the vehicle in aesthetically desirable locations.

Under first operating conditions, the lamp of this disclosure is operably mounted to a moveable panel of the vehicle. Under other operating conditions, such as when the moveable panel is in an open position, the lamp can be removed from the moveable panel and operably mounted to a fixed panel.

Operably mounting the lamps to the fixed panel when the moveable panel is in an open position can help to ensure that the lamps remain visible when the moveable panel is open. If the moveable panel is a liftgate, opening a moveable panel without repositioning the lamps can place the lamps in a position where the lamps are difficult to view.

Figure 1:
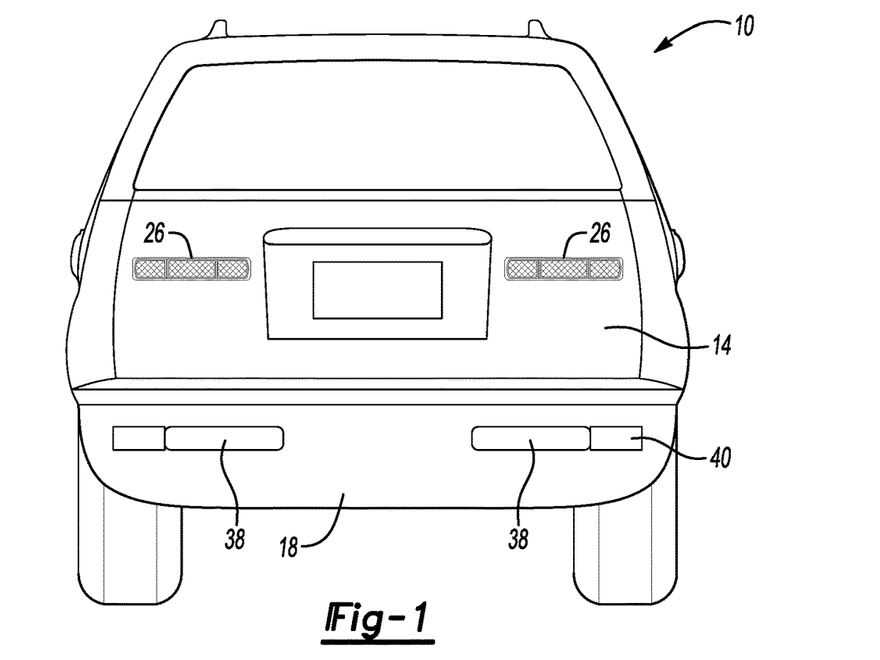
FIG. 1 illustrates a rear view of an example vehicle having lamps operably mounted to a moveable panel of the vehicle.

With reference to FIG. 1, a vehicle 10 includes a moveable panel 14 and a fixed panel 18. The moveable panel 14 is a liftgate in this example. In other examples, the moveable panel 14 is a door, tailgate, or trunk lid. The fixed panel 18 is a rear fascia along a rear of the vehicle 10. In other examples, the fixed panel 18 could be along a side or front of the vehicle 10.

For purposes of this disclosure, moveable panels are the body panels of the vehicle 10 that can be moved and articulated while the other portions of the vehicle 10 remain stationary. The movement could be rotation about a hinge. The fixed panels are the body panels of the vehicle 10 that are not intended to move when the vehicle 10 is moving, or parked and stationary.

Figure 2:
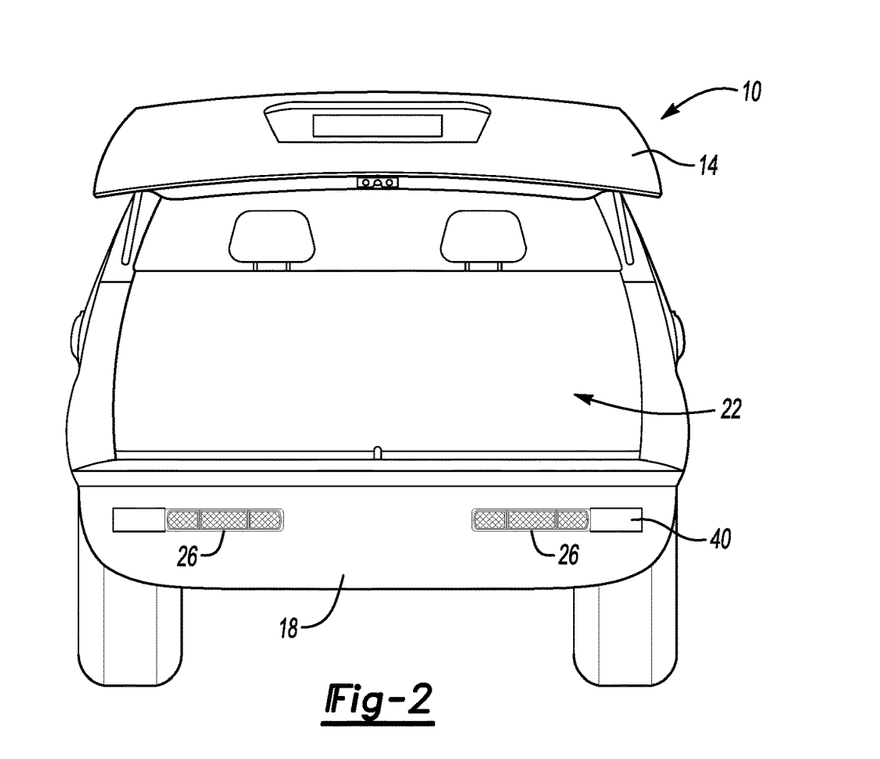
FIG. 2 illustrates the vehicle of FIG. 1 with the moveable panel in an open and unlatched position and the lamps repositioned such that the lamps are operably mounted to a fixed panel of the vehicle.

The moveable panel 14 is in a closed and latched position in FIG. 1. The moveable panel 14 is moveable to an open and unlatched position as shown in FIG. 2. Opening the moveable panel 14 provides access to a cargo area 22 of the vehicle 10.

Under typical operating conditions, the vehicle 10 is driven with the moveable panel 14 closed and latched as shown in FIG. 1. Under some operating conditions, however, the vehicle 10 may be driven with the moveable panel 14 in the open position of FIG. 2. For example, if the vehicle 10 is used to transport cargo that is larger than the cargo area 22, the vehicle 10 can be driven with the moveable panel 14 open to provide clearance for the cargo to project rearward from the cargo area 22.

Lamps 26 are operably mounted to the moveable panel 14 in FIG. 1. The lamps 26 can selectively illuminate to indicate, for example, that the vehicle 10 is braking. The lamps 26 can also selectively illuminate to indicate a turning direction of the vehicle 10. The lamps 26 could selectively illuminate at other times as well, such as when hazard lighting of the vehicle 10 is activated. The lamps 26 in the exemplary embodiment include a brake lamp. In particular, the lamps 26 are a combination lamp that includes a selectively activated braking lamp, turn signal lamp, and taillight lamp.

As can be appreciated, when the moveable panel 14 is moved to the open and unlatched position of FIG. 2, the lamps 26, if operably mounted to the moveable panel 14, would not be easily viewed by someone behind the vehicle 10.

Requirements may dictate that lamps at a rear of a vehicle remain visible when a moveable panel is raised. For this reason, many vehicles incorporate lamps in moveable panels, and then redundant lamps in fixed panels.

Figure 3:
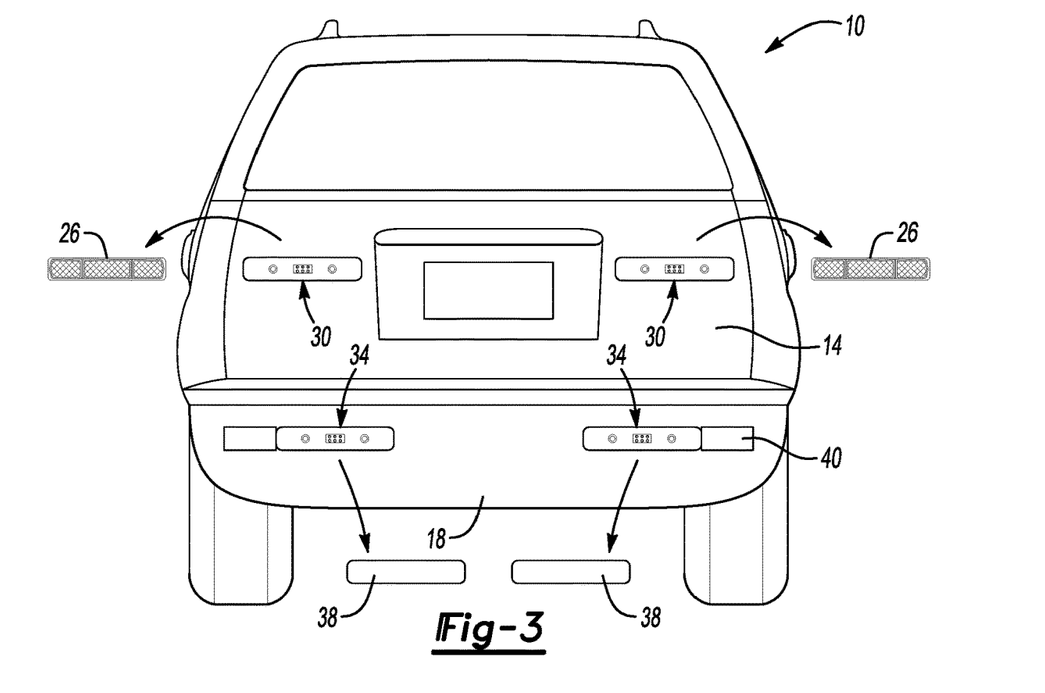
FIG. 3 illustrates the vehicle of FIG. 1 with the lamps removed.
Figure 4:
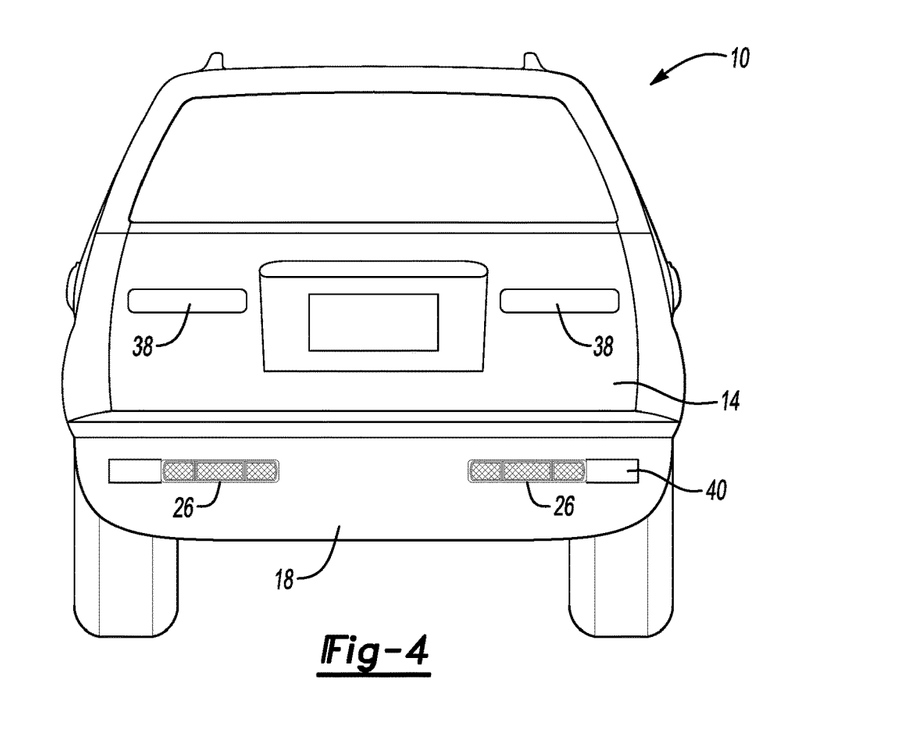
FIG. 4 illustrates the vehicle of FIG. 1 with the moveable panel closed and the lamps repositioned such that the lamps are operably mounted to the fixed panel.

With reference to FIGS. 3 and 4, the lamps 26 are configured such that the lamps 26 can be removed from the moveable panel 14 and repositioned within the fixed panel 18. When repositioned within the fixed panel 18, the lamps 26 are visible when the moveable panel 14 is in the open and unlatched position. Redundant lamps in both the moveable panel 14 and the fixed panel 18 are thus not required.

The moveable panel 14 includes pockets 30 that each receive one of the lamps 26 when the lamps 26 are operably mounted to the moveable panel 14. The fixed panel 18 includes pockets 34 that each receive one of the lamps 26 when the lamps 26 are operably mounted to the fixed panel 18.

When the lamps 26 are mounted to the moveable panel 14, a cover or rub strip 38 can be attached to the fixed panel 18 to conceal at least a portion of the pockets 34 within the fixed panel 18. The rub strips 38 can act a trim guards while concealing the pockets 34. The rub strip 38 could be molded in a certain color, chromed, painted, or some combination of these. The color of the rub strip 38 could match a color of the fixed panel 18 or could be a different accent color.

In this example, the fixed panel 18 includes a reflector 40 disposed adjacent to each of the pockets 34 of the fixed panel 18. In another example, the reflectors 40 could extend into at least a portion of the pockets 34.

When the lamps 26 need to be repositioned from the moveable panel 14 to the fixed panel 18, the lamps 26 can be removed, as shown in FIG. 3, from the pockets 30. The rub strips 38 can also be detached from the fixed panel 18. The lamps 26 can then be repositioned to fit within the pockets 34 and operably mounted to the fixed panel 18. The rub strips 38 can correspondingly be attached to the moveable panel 14 to cover the pockets 30.

Figure 5:
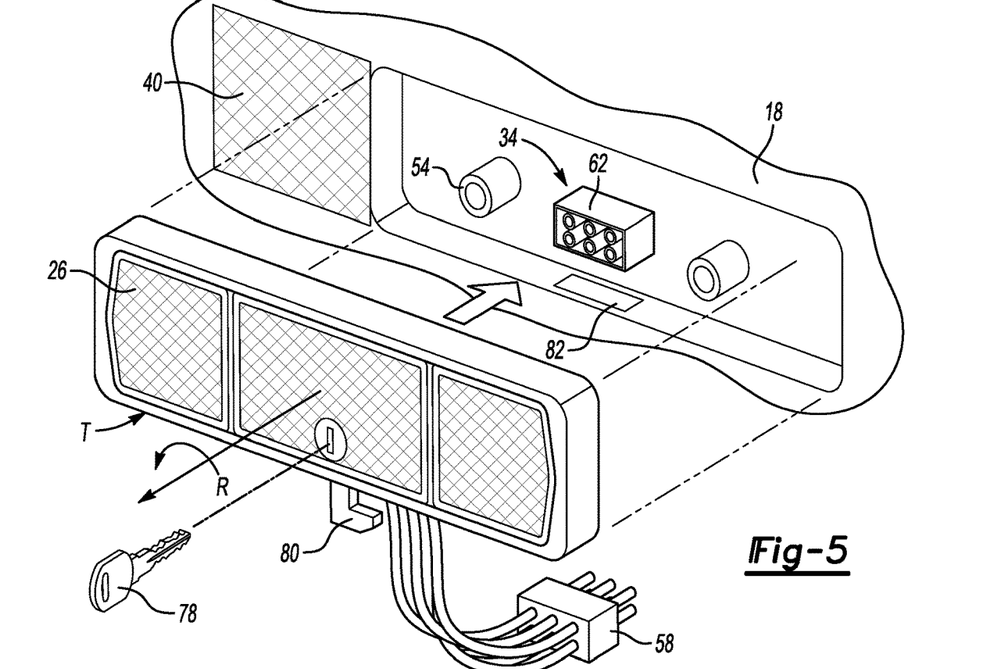
FIG. 5 illustrates a perspective view of a lamp from the vehicle of FIG. 1 as the lamp is being operably mounted to the fixed panel.
Figure 6:
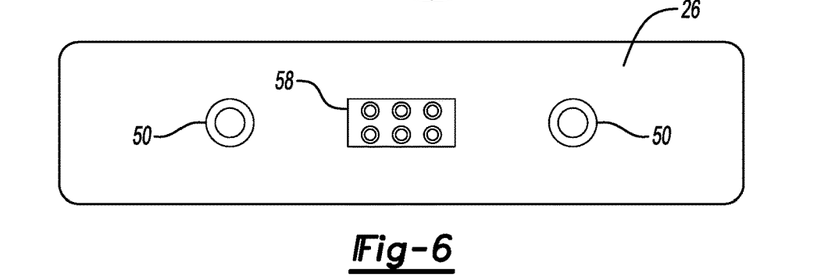
FIG. 6 illustrates a rear view of the lamp of FIG. 5.
Figure 7:
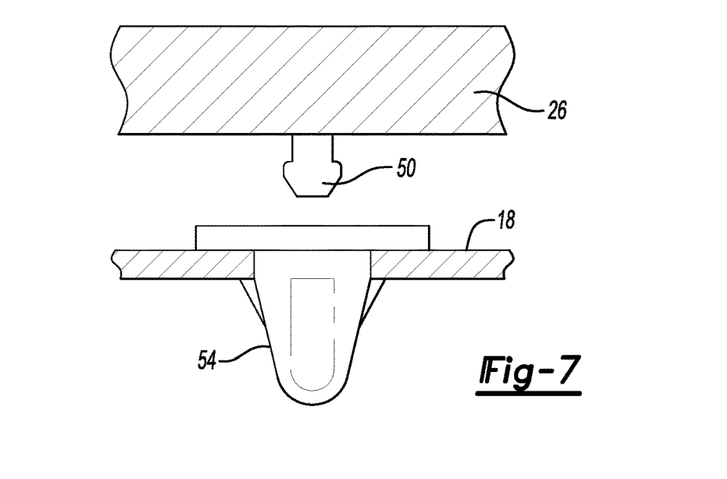
FIG. 7 illustrates a partially section view through a connector used to mount the lamp.

With reference now to FIGS. 5-7, operably mounting the lamps 26 to the fixed panel 18 includes, in this example, fitting a plurality of posts 50 within respective grommets 54. The posts 50 have an enlarged head that fits within the grommets 54 to hold the lamp 26 at least partially within the pocket 34.

In this embodiment, the posts 50 extend from a backside of the lamp 26, and the grommets 54 are held within a floor of the pocket 34 provided by the fixed panel 18. The connection strategy could be reversed if required, such that the lamps 26 include the grommets 54 and the posts 50 extend from the floor of the pocket 34.

Operably mounting the lamp 26 to the fixed panel 18 further involves coupling an electrical connector 58 of the lamp 26 to a corresponding electrical connector 62 held by the fixed panel 18. The coupling of the connectors 58 and 62 provides power to the lamp 26 and can control the lighting of the lamp 26 in response to, for example, activation of a turn signal of the vehicle 10, braking the vehicle 10, etc.

Figure 8:
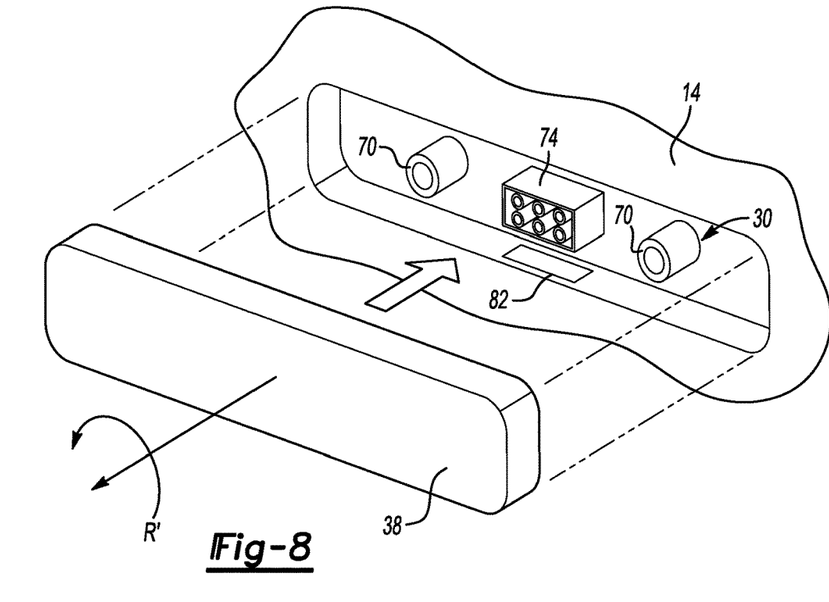
FIG. 8 illustrates a perspective view of a rub strip from the vehicle of FIG. 1 as the rub strip is being attached to the moveable panel.
Figure 9:
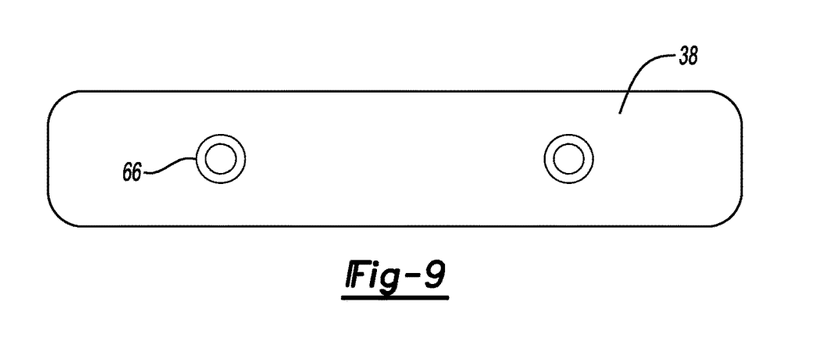
FIG. 9 illustrates a rear view of the rub strip of FIG. 8.
Figure 10:
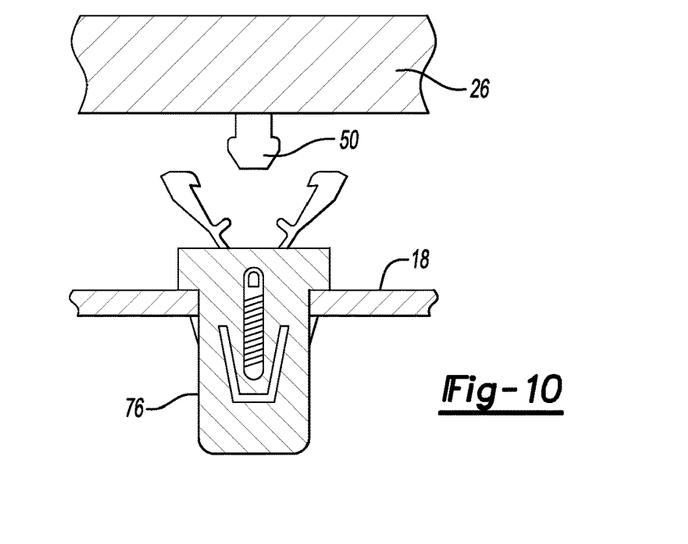
FIG. 10 illustrates a partially section view through a connector used to mount the lamp according to another exemplary, non-limiting embodiment.

With reference now to FIGS. 8 and 9, attaching the rub strip 38 to the moveable panel 14 involves inserting posts 66 extending from a backside of the rub strip 38 into corresponding grommets 70 held by the moveable panel 14. The configuration of the posts 66 is similar to that of the posts 50 extending from the lamp 26. The connection strategy could be reversed if required, such that the rub strip 38 includes the grommets 54 and the posts 66 extend from the floor of the pocket 34.

When the lamp 26 is operably mounted to the moveable panel 14 as shown in FIG. 1, the posts 50 of the lamp 26 are received within the grommets 70 held by the moveable panel 14. When the rub strip 38 is attached to the fixed panel 18, as shown in FIG. 1, the posts 66 of the rub strip 38 are received within the grommets 54 held by the fixed panel 18.

The posts 66 of the rub strip 38 replicate or mimic the posts 50 of the lamp 26. Thus, the grommets 70 that receive the posts 50 of the lamp 26 in FIG. 1 can selectively instead receive the posts 66 of the rub strip 38. Similarly, the same grommets 54 that receive the posts 66 of the rub strip 38 in FIG. 1 can selectively instead receive the posts 50 of the lamp 26. Put another way, the lamps 26 can be swapped back-and-forth between the pockets 30 and the pockets 34, and the rub strips 38 can be swapped back-and-forth between the pockets 30 and the pockets 34.

The connection strategy is, in some examples, referred to as a Gary-Ball connector. Although disclosed as posts 50 and 66 selectively received within grommets 54 and 70, other types of attachment strategies could be utilized to selectively secure the lamp 26 to the moveable panel 14 or the fixed panel 18, and to secure the rub strip 38 to the moveable panel 14 or the fixed panel 18. The other types of connection strategies can include, in particular, push-pull connection strategies. FIG. 9 shows another example of such an assembly where the grommets 54 and 70 are replaced with a snap-fit connector 75.

Some connection strategies can include secure the lamp 26, the rub strip 38, or both with screws or clips. It some examples, the same connection strategy used to secure the lamp 26 is not used for to secure the rub strip 38. For example, the lamp 26 could be secured using posts and grommets as described above, but the rub strip 38 is secured using threaded fasteners that engage threaded bores opening to an area of the pockets 30, 34, as required.

After the lamps 26 and rub strips 38 have been swapped from the position of FIG. 1 to the position of FIG. 3, the moveable panel 14 can then be opened, unlatched, and moved to the position of FIG. 2. The vehicle 10 can then be driven with the moveable panel 14 in the position of FIG. 3, with the lamps 26 remaining visible from behind the vehicle 10.

The lamps 26 maintain functionality when operably mounted to the fixed panel 18 due to the coupling of the connectors 58 and 62. When the lamps 26 are operably mounted to the fixed panel 18, the lamps 26 are powered through the fixed panel 18. That is, the lamps 26 are powered by power moved through the fixed panel 18 to the lamps 26.

When the lamps 26 are operably mounted to the moveable panel 14, the connectors 58 of the lamps engage moveable panel connectors 74 (FIG. 7) within the pockets 30. The engaging of the connectors 58 of the lamps 26 with the connectors 74 enables the lamps 26 to be powered through the moveable panel 14 when the lamps 26 are operably mounted to the moveable panel 14. In some examples, the rub strips 38 could each include a dummy connector that engages the connector 62 when the rub strip 38 is attached to the fixed panel 18, and engages the connector 74 when the rub strip 38 is attached to the moveable panel 14. Engaging the connectors 62, 74 with the dummy connectors can protect and seal the connectors 62, 74 when the connectors 62, 74 are not used to power the lamps 26.

With reference again to the connection strategy detailed in connection with FIGS. 5-9, two posts 50 are used to connect each of the lamps 26 to the fixed panel 18 or the moveable panel 14. Similarly, two posts 66 are used to connect the rub strip 38 to the fixed panel 18 or the moveable panel 14.

The positioning of the posts 50 on a first lateral side of the lamps 26 mimics a positioning of the post 50 on the opposing, lateral side of the lamps 26. The lamp 26 can be rotated 180 degrees in a direction R and still be engageable with the grommets 54.

The rub strip 38 is configured similarly in that the rub strip 38 can be rotated 180 degrees in a direction R' and still engage the grommets 70 or the grommets 54.

This attachment strategy can facilitate part commonization due to, among other things, the commonly configured lamp 26 being useable on both a passenger side and a driver side of the vehicle 10. That is, it not necessary to design a passenger side lamp and a separate, differently dimensioned driver side lamp.

If, for example, a turn signal portion T of the lamp 26 is desired to be the laterally outermost portion of the lamp 26 on the driver side and on the passenger side of the vehicle 10, the lamp 26 can be installed as shown in FIG. 5. A similar lamp 26 can then be installed on a passenger side of the vehicle 10, but rotated 180 degrees about the direction R so that the turn signal portion T of the lamp 26 is on the passenger side is the laterally outermost portion of the lamp 26.

Similarly, the common rub strip 38 can be used to cover pockets 30 on both the passenger and driver side of the moveable panel 14 and, as required, engage the fixed panel 18 on the passenger side or the driver side.

In this example, the rub strip 38 is a molded, polymer based part. A common mold tool can be used to produce a rub strip 38 appropriate for use on the passenger and driver sides of the vehicle 10, which reduces overall part complexity.

In some examples, the lamps 26 may be lockable when operably mounted to the moveable panel 14, the fixed panel 18, or both. A key 78 may be required to transition a lock 80 in order to detach the lamps 26 from the operably mounted position. Without the key 78, the lamps 26 cannot be detached, which can prevent unauthorized removal of the lamps 26. The key 78 can be stored within a glovebox of the vehicle 10 when not required. The lock 80 can include a flange that fits within a slot 82 within the pocket 30 or the pocket 34 to prevent removal of the lamp 26.

Figure 11:
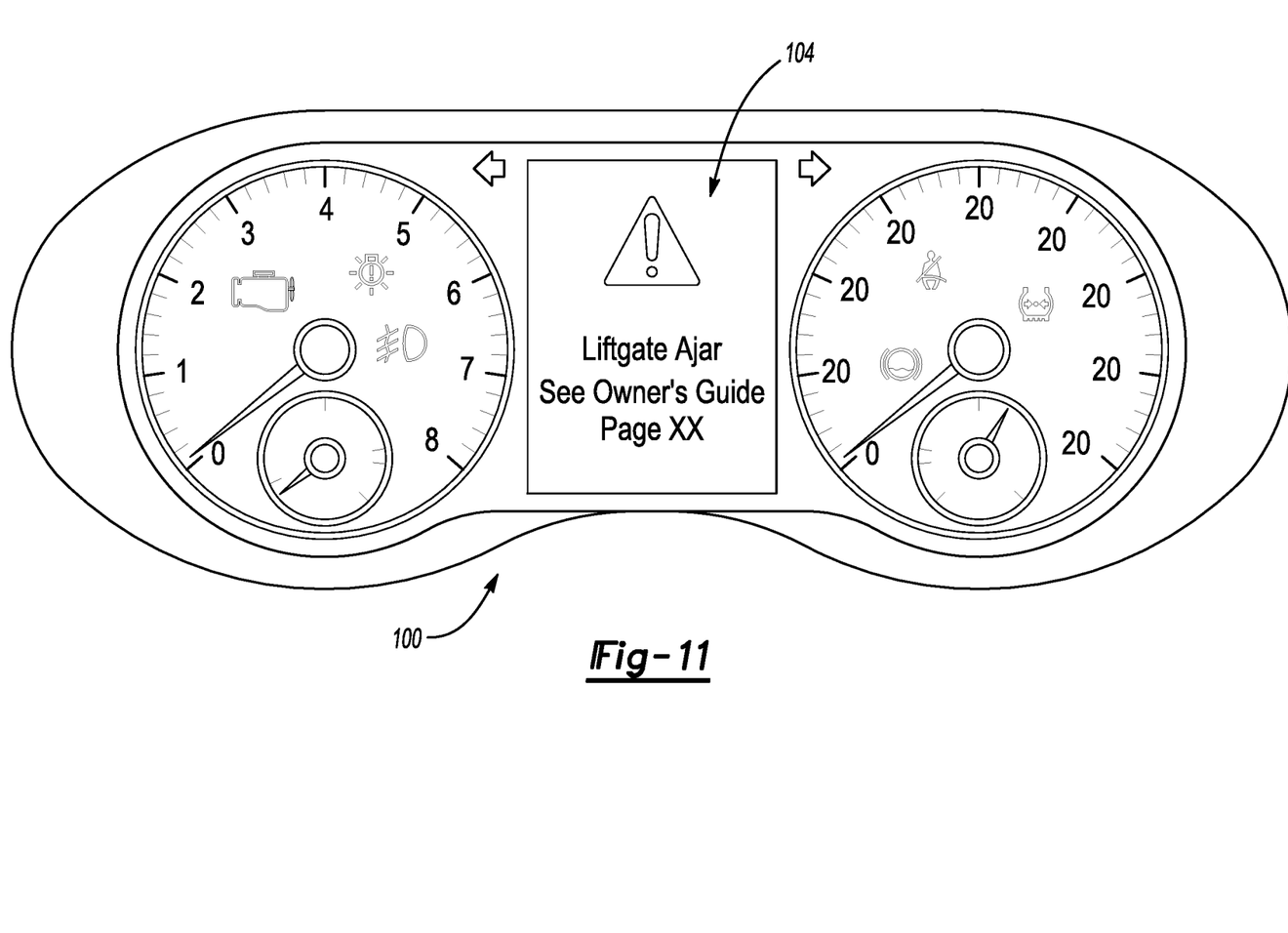
FIG. 11 illustrates a view of an alert illuminated within a display on an interior of the vehicle.

With reference now to FIG. 11, the vehicle 10 can include a display 100 that provides an indicator 104 notifying an operator of the vehicle 10 that switching the lamps 26 from the position of FIG. 1 to the position of FIG. 2 is needed. The display 100 can be an in-dash display, for example. The indicator 104 could refer the user to a particular section of within an owner's manual of the vehicle 10, which explains how to reposition the lamps 26 from the moveable panel 14 to the fixed panel 18.

The indicator 104 is, in this example, selectively illuminated within a portion of the display 100. The indicator 104 may transition to an illuminated state in response to the vehicle 10 sensing that the moveable panel 14 is in the open position of FIG. 3, but that the lamps 26 remain operably mounted to the moveable panel 14. The illuminated indicator 104 can prompt the user of the vehicle 10 to disconnect the lamps 26 from the moveable panel 14 and to reposition the lamps 26 within the fixed panel 18.

Proximity sensors, or another type of sensor, could be used to detect the position of the moveable panel 14 and the lamps 26. A person having skill in this art and the benefit of this disclosure could identify a sensor appropriate for detecting the presence of a component.

In some examples, the vehicle 10 the indicator could instead, or additionally, be a gear shift of the vehicle 10, and the transitioning of the indicator could include preventing the user from shifting the vehicle 10 into a gear if the lamps 26 have not been repositioned within the fixed panel 18 when the moveable panel 14 is in the open position of FIG. 2. The vehicle 10 could, for example, prevent the user of the vehicle 10 from moving from park into a drive gear until the lamps 26 have been repositioned within the fixed panel 18.

In still other examples, the transitioning of the indicator could include flashing the hazards, honking the horn, to notify the user that the lamps 26 should be repositioned.

A feature of the disclosed examples include eliminating redundant lamps utilized within vehicles. Such redundant lamps can add cost and complexity. Another feature can include providing attachment systems allowing a common lamp to be positioned on a passenger side, or rotated and positioned on a driver side of the vehicle. Yet another feature can include providing warnings and reminders to a user if a lamp need to be repositioned due to a position of the moveable panel. In some examples, the vehicle could prevent placing the vehicle in gear until confirming that the lamps have been repositioned appropriately.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A lamp placement method, comprising:
   under a first operating condition, operably mounting a lamp to a moveable panel of a vehicle;
   under a different, second operating condition, operably mounting the lamp to a fixed panel of the vehicle,
   wherein the first operating condition corresponds to the moveable panel being in a closed position, and the second operating condition corresponds to the moveable panel being in an open position; and
   blocking a shifting of the vehicle to a gear if the moveable panel is in the open position and the lamp is not operably mounted to the fixed panel.

2. The lamp placement method of claim 1, wherein the first operating condition corresponds to the moveable panel being in a closed position, and the second operating condition corresponds to the moveable panel being in an open position.

3. The lamp placement method of claim 2, further comprising transitioning an indicator if the moveable panel is in the open position and the lamp is not operably mounted to the fixed panel.

4. The lamp placement method of claim 3, wherein the transitioning of the indicator comprises illuminating an indicator within a display.

5. The lamp placement method of claim 2, wherein the moveable panel is in the closed position when latched, and the moveable panel is in the open position when unlatched.

6. The lamp placement method of claim 1, further comprising at least partially receiving the lamp within a pocket of the fixed panel when the lamp is operably mounted to the fixed panel, and covering at least a portion of the pocket with a rub strip when the lamp is operably mounted to the moveable panel.

7. The lamp placement method of claim 1, wherein the lamp is a brake lamp, and the moveable panel is a liftgate.

* * * * *